L. S. KASSON.
MACHINE FOR PREPARING ROAD WEARING SURFACES.
APPLICATION FILED DEC. 17, 1908.

1,163,825.

Patented Dec. 14, 1915.
5 SHEETS—SHEET 1.

WITNESSES:

INVENTOR

BY

ATTORNEYS

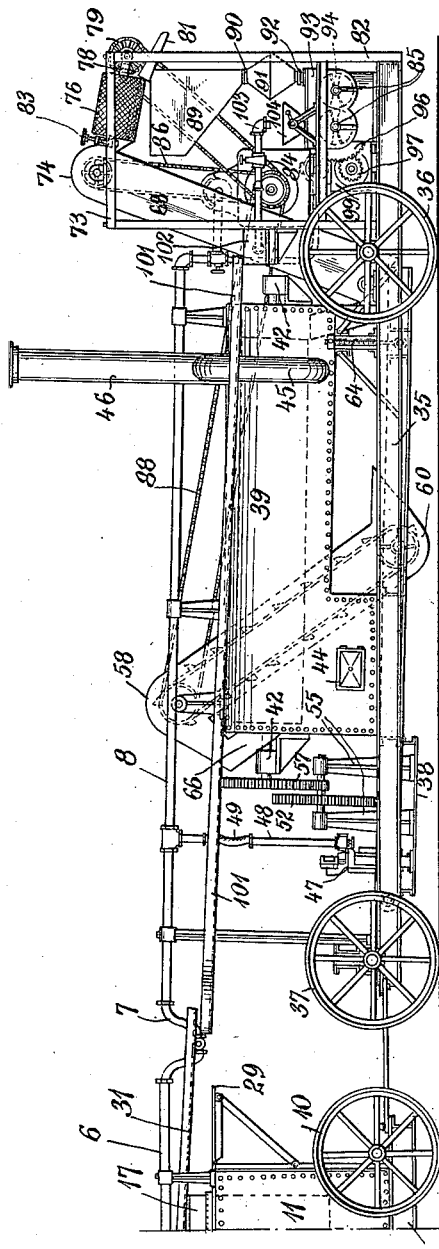

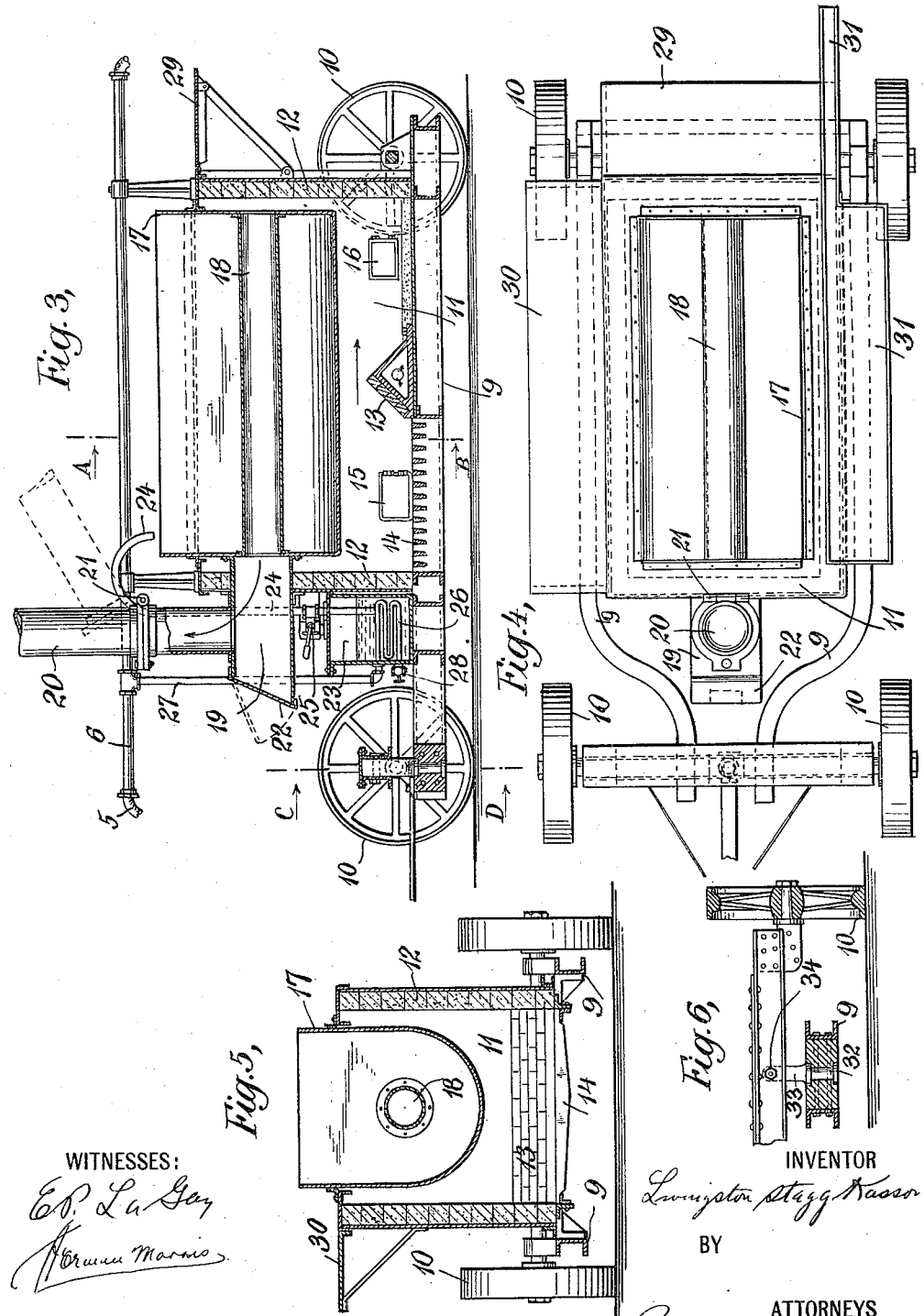

L. S. KASSON.
MACHINE FOR PREPARING ROAD WEARING SURFACES.
APPLICATION FILED DEC. 17, 1908.

1,163,825.

Patented Dec. 14, 1915.
5 SHEETS—SHEET 4.

WITNESSES:

INVENTOR

BY

ATTORNEYS

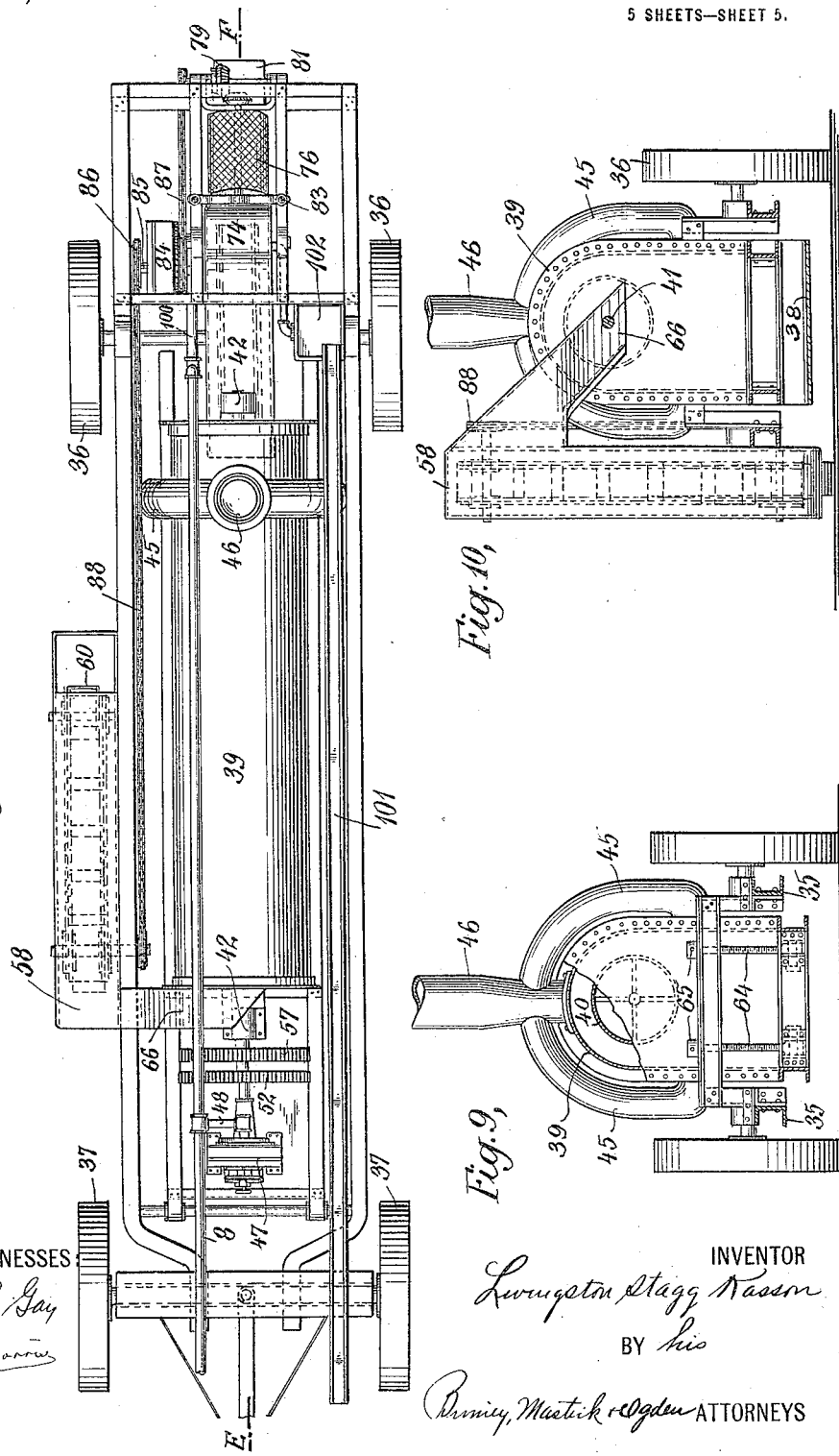

UNITED STATES PATENT OFFICE.

LIVINGSTON STAGG KASSON, OF NEW YORK, N. Y., ASSIGNOR TO THE A. L. BARBER ASPHALT COMPANY, OF NEW YORK, N. Y., A CORPORATION OF THE DISTRICT OF COLUMBIA.

MACHINE FOR PREPARING ROAD WEARING-SURFACES.

1,163,825.  Specification of Letters Patent.  Patented Dec. 14, 1915.

Application filed December 17, 1908. Serial No. 467,963.

*To all whom it may concern:*

Be it known that I, LIVINGSTON STAGG KASSON, a citizen of the United States, and a resident of the borough of Manhattan, city, county, and State of New York, have invented certain new and useful Improvements in Machines for Preparing Road Wearing-Surfaces, of which the following is a specification accompanied by drawings.

My invention relates to improvements in machines for preparing road-wearing surfaces, wherein means is provided for preparing and mixing the various materials to be used, as the machine moves along the road to be surfaced, for discharging said materials as desired ready for spreading and rolling and for moving said machine along the road.

In the following I have described, with reference to the accompanying drawings, an apparatus embodying one form of my invention illustrated as especially adapted for use in connection with bituminous pavements, the features thereof being more particularly pointed out hereinafter in the claim.

Figure 1:
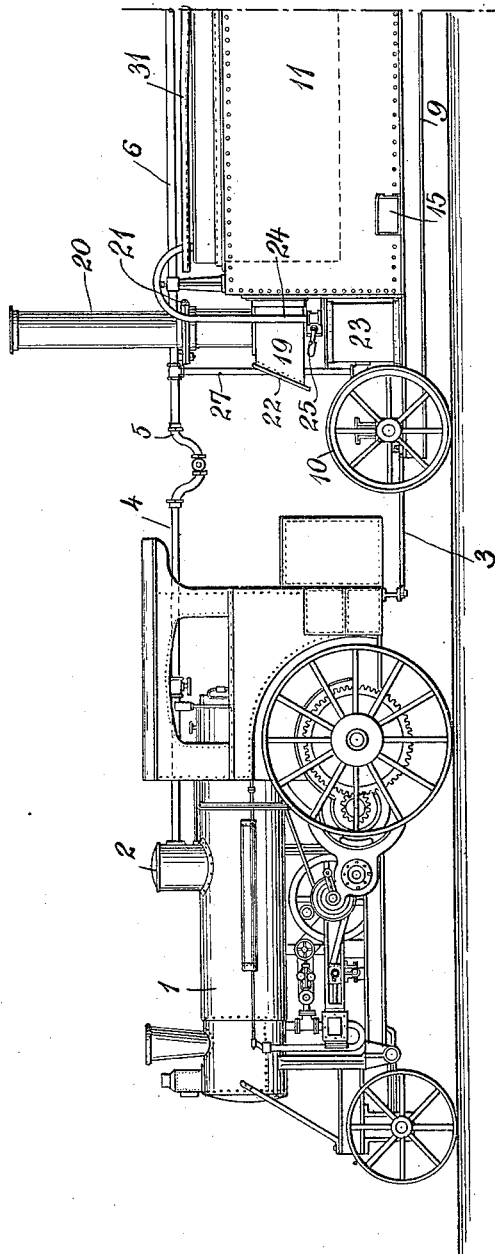
Figure 7:
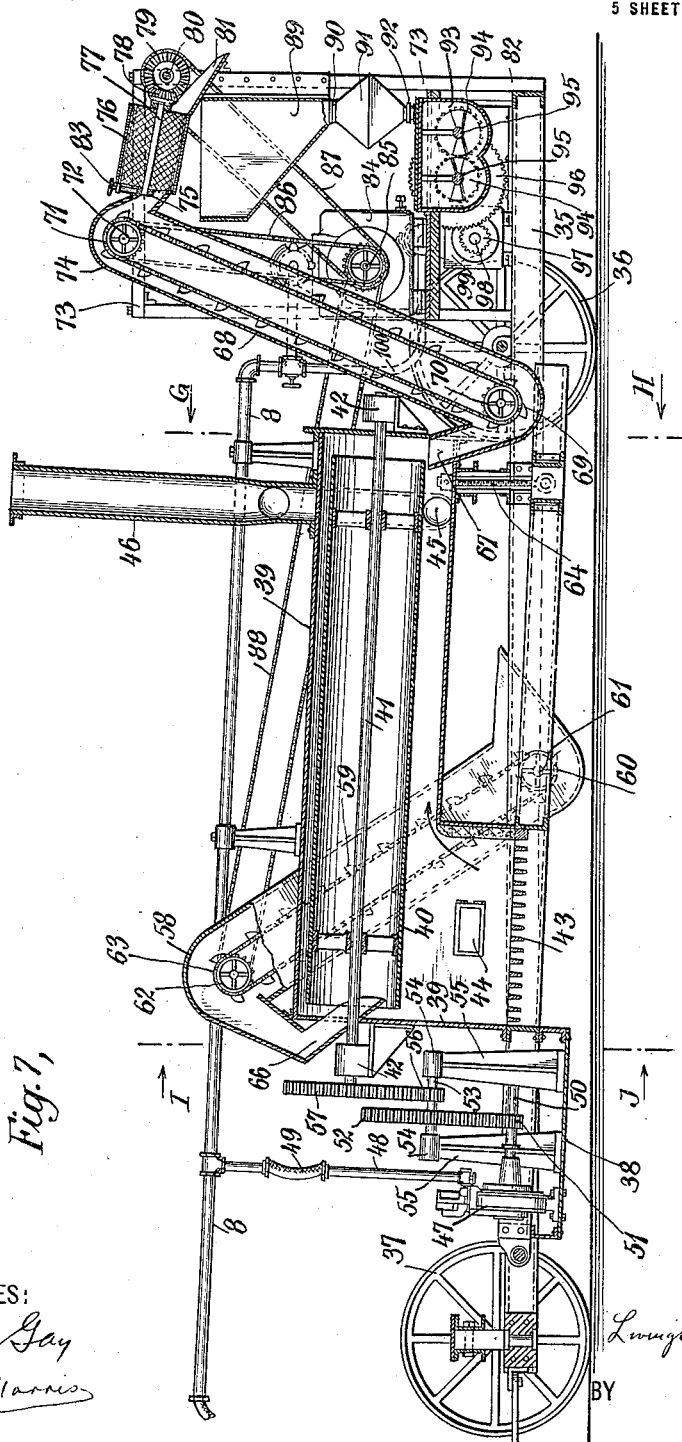

In the drawings Figures 1 and 2 show a side elevation of a machine illustrating one form of my invention, Fig. 2 being in continuation of Fig. 1, so that when the figures are placed end to end along the dotted lines at the left of Fig. 2, and at the right of Fig. 1, the complete machine is shown. Fig. 3 is a vertical sectional view of the asphalt heating section. Fig. 4 is a plan view of the asphalt heating section, parts being removed. Fig. 5 is a cross sectional view of the parts shown in Fig. 3 along the line A, B. Fig. 6 is a sectional view of parts shown in Fig. 3 along the line C, D, parts being broken away. Fig. 7 is a vertical sectional view of the drying and mixing section along the line E, F, of Fig. 8. Fig. 8 is a plan view of the drying and mixing section. Fig. 9 is an elevation partly in section and partly broken away, of the device shown in Fig. 7 along the line G, H, and, Fig. 10 is an elevation partly in section of the device shown in Fig. 7 along the line I, J.

Similar numerals indicate similar parts throughout the several views.

In the drawings the machine is shown as divided into three sections, each section being shown as a car, supporting certain operating parts, the first section comprising a traction engine, the second, the asphalt heating section, and the third, the drying and mixing section, as will be more specifically pointed out.

The traction engine, which is shown in elevation in Fig. 1, comprises an engine of any convenient type, the construction of which forms no part of this invention, and hence will not be further described. In the traction engine, 1 indicates the boiler, and 2 the steam-dome. The traction engine is connected to the second section by any convenient means, such as by a pole 3.

4 is a steam-pipe connected through a flexible coupling 5 with steam-pipe 6, the steam-pipe 6 being connected in turn through flexible coupling 7 with steam-pipe 8.

The second section comprises a truck 9 supported on wheels 10. Truck 9 supports a fire-box 11, having a suitable fire-brick lining 12 and a bridge wall 13.

14 is a grate for supporting fuel adapted to be supplied thereto through door 15. Grate 14 is supplied with an ashpan beneath the same (not shown).

16 is a cleaning out door for giving access to the rear part of fire-box 11.

17 is an asphalt tank preferably of the shape shown in Fig. 5 and open at the top, the tank being supported in any suitable manner in the fire-box 11. The products of combustion from grate 14 are adapted to pass along the bottom of the tank 17 in the direction of the arrow, toward the rear and then forward through the tank through flue 18 into uptake 19 communicating with smoke-stack 20, which latter is hinged at 21 as is clearly shown in Fig. 3.

22 is a door to uptake 19 adapted to give access to flue 18 for the purpose of cleaning the same.

23 is an oil tank adapted to contain oil which may be pumped through pipe 24 discharging into asphalt tank 17.

25 is a hand pump for forcing the oil from tank 23 through pipe 24 into tank 17.

26 is a steam coil connected with steam-pipe 6 by pipe 27 and provided with a valve 28 for discharging the water of condensation.

29 is a platform fastened to the rear wall of the fire-box in any convenient way, and 30 is a platform fastened to one side of the fire-box in any convenient manner. The platforms 29 and 30 afford means for an operator to readily pass around the asphalt tank 17, as desired.

31 is a trough into which the asphalt may be dipped, so that it may pass in a liquid form to the third section of the machine, as hereinafter described.

The forward axle of both the second and third sections is fastened to the pole connecting it with the next preceding section and supports the truck in the manner more specifically shown in Figs. 4 and 6. The pole is coupled at its forward end, so as to allow the usual freedom of movement, while at its rear end it is so connected to the axle as to allow only a vertical movement and not a lateral movement. The truck is suspended from the axle as is shown in Fig. 6, where a fifth wheel 32 is adapted to turn freely in the truck and is suspended from the axle by a neck 33 pivotally connected with the axle as at 34. Such an arrangement permits of freedom of movement and action in spite of the inequalities of the ground over which the apparatus may travel, and at the same time prevents one section from overriding the other.

The drying and mixing section comprises a truck 35 supported on wheels 36, 36, the forward axle having a fifth wheel arrangement, as already described in connection with the second section. The drier is pivoted to truck 35 at 37 and comprises a supporting platform 38, a casing 39 and a drum 40. The drum 40 is fast on a shaft 41, turning in bearings 42, 42, supported in any suitable manner on the walls of casing 39.

43 is a grate provided with a suitable ash box (not shown) to which access is had through door 44, the products of combustion passing rearwardly under drum 40 to a divided flue 45 connecting with a suitable smoke-stack 46.

47 is a steam engine of any suitable type, supplied with steam through pipe 48 from pipe 8, 49 being a flexible connection between steam-pipes 8 and 48. Shaft 50 of engine 47 carries a pinion 51 meshing with a spur-wheel 52 on a cross-shaft 53 turning in bearings 54, supported on standards 55 in turn resting on platform 38. Shaft 53 carries a pinion 56 meshing with a spur-wheel 57, fast on shaft 41.

58 is a hood or casing inclosing elevator 59, which passes at one end over sprocket-wheel 60, turning on shaft 61, finding bearings in the lower end of casing 39 and at the other end over sprocket-wheel 62, turning on shaft 63, which finds its bearings in the walls of the casing.

The bottom of casing 39 is adjustably connected with truck 35 by means of screws 64, 64, which may be adjusted by turning nuts 65, 65.

The object of the pivotal connection of the drier at 37 and the adjustable connection at 64, 64, is to provide for a constant backward slope of the drum, whatever the surface of the ground, so that the material discharged into the end of the drum, over elevator 59, through hopper 66, may be progressed by gravity until it is discharged through the other end of the drum into hopper 67.

The mixing arrangement is shown at the rear end of the third section and is more particularly described as follows:—Hopper 67 is provided with an elevator 68, passing at its lower end over a sprocket-wheel 69, turning on a shaft 70, supported from truck 35 in any convenient manner (not shown). At its upper end the elevator 68 passes over a sprocket-wheel 71, on a shaft 72, supported in any convenient manner from framework 73. 74 is a hood or casing for the elevator 68. 75 is a chute discharging into screen 76, turning on a shaft 77, supported in suitable bearings and carrying at one end a gear 78 meshing with a gear 79 on cross-shaft 80, supported in bearings in framework 73. 81 is a chute for discharging the coarser materials from screen 76 on to the ground or into a suitable receptacle (not shown) as may be desired. Screen 76 is preferably adjustable about shaft 80 by means of a framework 82 pivoted on shaft 80, the other end of screen 76 being provided with an adjustable screw 83 for raising and lowering the screen to provide for any inequality of ground over which the device may travel.

84 indicates a steam engine of any convenient type and connected with steam-pipe 8. The shaft 85 of engine 84 carries a sprocket-wheel (not shown) geared by chain 86 to a sprocket-wheel (not shown) on shaft 72, thereby driving the same and operating elevator 68. Shaft 85 also carries a sprocket-wheel (not shown) geared by chain 87 to a sprocket-wheel (not shown) on shaft 80, thereby operating gear 79. Shaft 85 and engine 84 also carries a sprocket-wheel (not shown) geared by chain 88 to a sprocket-wheel (not shown) on shaft 63, thereby operating elevator 59.

89 is a hopper adapted to receive material from screen 76, and discharging through a slide-gate 90 into a measuring box 91, provided with a slide-gate 92, in turn discharging into mixer 93. Mixer 93 is provided with mixing-teeth 94, 94, on shafts 95, 95, suitably supported in the walls of the mixer. Shafts 95 are geared together, one of said shafts carrying a spur-wheel 96 gearing with spur-wheel 97 on shaft 98 of steam engine 99, which latter receives steam from pipe 8 through pipe 100.

Trough 31 discharges into trough 101, in turn discharging into tank 102 provided with a valve controlled outlet 103, discharging into hopper 104, in turn discharging into mixing chamber 93.

The operation of the device is clear from the foregoing description, the traction engine providing steam power for operating the various engines on the other sections of the device, as well as providing means for moving the whole arrangement from place to place.

It is obvious the details of the various mechanisms and the arrangement of parts may be widely varied without departing from the spirit of my invention and I do not restrict myself to either the details or the arrangement shown.

What I claim and desire to secure by Letters Patent is:—

In a propelled vehicle, the combination with the vehicle frame, of a rotary drier extending longitudinally of said frame, operating mechanism therefor rigidly mounted thereon in fixed alinement therewith, a rotary screen mounted longitudinally of said frame, conveying means extending from said drier to said rotary screening means, means for pivotally supporting one end of said rotary drier, means for tilting the other end of said drier relative to the pivotally mounted end and irrespective of the position of the front wheels of the vehicle relative to the rear wheels, means for pivotally supporting one end of said screening means and means for tilting the other end of said screening means relative to the pivotally mounted end irrespective of the position of the front wheels of the vehicle relative to the rear wheels.

In testimony whereof I have signed this specification in the presence of two subscribing witnesses.

LIVINGSTON STAGG KASSON.

Witnesses:
  E. P. LA GAY,
  HERMAN MORRIS.

Copies of this patent may be obtained for five cents each, by addressing the "Commissioner of Patents, Washington, D. C."